(12) United States Patent
Wentink (10) Patent No.: US 7,978,734 B2
(45) Date of Patent: Jul. 12, 2011

(54) MULTICHANNEL MAC DATA STREAM FOR WIRELESS COMMUNICATION

(75) Inventor: Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 1419 days.

(21) Appl. No.: 11/083,080

(22) Filed: Mar. 18, 2005

(65) Prior Publication Data

US 2005/0243849 A1 Nov. 3, 2005

Related U.S. Application Data

(60) Provisional application No. 60/553,978, filed on Mar. 18, 2004.

(51) Int. Cl.
*H04J 1/00* (2006.01)
(52) U.S. Cl. ........................................ 370/480; 370/473
(58) Field of Classification Search .................. 370/348, 370/319, 320, 344, 389, 394, 374, 469, 468, 370/477, 229, 232, 343, 391, 395, 200, 412; 455/566; 714/748; 725/63
See application file for complete search history.

(56) References Cited

U.S. PATENT DOCUMENTS

| | | | |
|---|---|---|---|
| 6,185,201 B1* | 2/2001 | Kiyanagi et al. | 370/343 |
| 6,212,189 B1* | 4/2001 | Petty | 370/395.61 |
| 6,662,330 B1* | 12/2003 | Hershey | 714/748 |
| 6,891,831 B1* | 5/2005 | Pihlaja | 370/394 |
| 7,009,967 B1* | 3/2006 | Hariharasubrahmanian | 370/389 |
| 7,027,989 B1* | 4/2006 | Tapadar et al. | 704/270 |
| 7,269,184 B2* | 9/2007 | Kobayashi | 370/468 |
| 2002/0159457 A1* | 10/2002 | Zhang et al. | 370/391 |
| 2002/0163879 A1* | 11/2002 | Li et al. | 370/200 |
| 2003/0067943 A1* | 4/2003 | Arsenault et al. | 370/468 |
| 2003/0103453 A1* | 6/2003 | Huang et al. | 370/229 |
| 2004/0037302 A1* | 2/2004 | Varma et al. | 370/412 |
| 2007/0073851 A1* | 3/2007 | Baikov et al. | 709/220 |

* cited by examiner

*Primary Examiner* — Kwang B Yao
*Assistant Examiner* — Syed M Bokhari (57) ABSTRACT

A system and method of transmitting a stream of data are provided. A stream of data to be transmitted is identified. The stream of data is divided into a plurality of data segments for transmission on a corresponding plurality of transmission channels. The plurality of segments are transmitted on the corresponding plurality of transmission channels, wherein each segment is transmitted at substantially the same time as the other segments and for substantially the same duration of time.

20 Claims, 8 Drawing Sheets

MULTICHANNEL MAC DATA STREAM FOR WIRELESS COMMUNICATION

RELATED APPLICATIONS

This application claims priority to U.S. Provisional Application No. 60/553,978, filed Mar. 18, 2004, the disclosure of which is incorporated herein by reference in its entirety.

FIELD OF THE INVENTION

This invention relates to the transmission and reception of data. More specifically, this invention relates to the transmission of a stream of data over a plurality of channels.

BACKGROUND OF THE INVENTION

Various transmission protocols to transfer data between two or more nodes, e.g., in a network. Many protocols are designed to maximize the rate at which a stream of data can be transmitted from one node to another while minimizing errors. For instance, some protocols such as TCP/IP allow a stream of data to be broken up into packets and transmitted through various transmission paths to a receiver. The receiving node concatenates the data packets back into the original data stream.

Multiple channels such as multiple transmission frequencies can be used to deliver data between nodes. However, channels are typically used for transmitting different sets of data. For instance, one set of nodes may communicate over one channel while other sets of nodes communicate over other channels. Also, a single node may simultaneously transmit two or more different data sets over two or more channels to two or more different parties. Thus, a single node may use different channels to simultaneously send different messages to different nodes.

SUMMARY OF THE INVENTION

Accordingly, various embodiments of the present invention may be directed to a system and method for transmitting a stream of data. A stream of data to be transmitted is identified. The stream of data is divided into a plurality of data segments for transmission on a corresponding plurality of transmission channels. The plurality of segments are transmitted on the corresponding plurality of transmission channels, wherein each segment is transmitted at substantially the same time as the other segments and for substantially the same duration of time.

According to another embodiment, a method of receiving data is provided. A plurality of data segments are received in a transmission over a plurality of channels that begins and ends at substantially the same time, wherein the plurality of data segments correspond to a stream of data transmitted from a transmission station via the plurality of channels. The data segments are concatenated into an order that corresponds to an original order of the data segments in the stream of data.

According to another embodiment, a method of transmitting and receiving data is provided. A stream of data to be transmitted is identified. The stream of data is divided into a plurality of data segments for transmission on a corresponding plurality of transmission channels. The plurality of segments is transmitted on the corresponding plurality of transmission channels, wherein each segment is transmitted at substantially the same time for substantially the same duration of time. A plurality of data segments are received at substantially the same time via a plurality of transmission channels, wherein the plurality of data segments correspond to a stream of data transmitted from a transmission station via the plurality of channels. The data segments are concatenated into an order that corresponds to an original order of the data segments in the stream of data.

DETAILED DESCRIPTION OF EXEMPLARY EMBODIMENTS

Various embodiments of the invention are directed to systems and methods for transmitting and/or receiving a stream of data over multiple wireless channels having different transmission rates. For instance, a stream of data may be passed from one transceiver to one or more other transceivers via two or more wireless channels, wherein each channel has an associated data transmission rate. The stream of data may be divided into two or more segments to be transmitted on the two or more channels, respectively. The stream may be divided into segments wherein the size of each segment is related to the transmission rate of the channel through which it will be transmitted. In some embodiments, the stream is divided into segments that can be transmitted over the various channels in substantially the same amount of time. The segments may then be transmitted over the corresponding channels during substantially the same period of time.

In some embodiments, the size of each segment may be substantially proportional to the transmission rate of its corresponding channel. Thus, the length of time needed to transmit each segment via its corresponding channel (equal to segment length divided by transmission rate) may be substantially equal for each segment and channel. Segments may be transmitted in such a way that they have substantially the same transmission starting and completion times. After segments are transmitted, subsequent segments may be transmitted using the same or similar methods.

One or more receiving nodes may receive the various segments over the various channels. The receiving nodes may concatenate the segments back into the original data stream. Accordingly, a data stream may be divided into segments, transmitted over a plurality of channels at substantially the same time, received at a receiving node, and concatenated back into the data stream. This process may proceed continuously for a continuous stream of data.

At various times, the receiving node(s) may pass information back to the transmitting node about any gaps in the segments or other errors. The transmitting node may then re-transmit the portion of the data stream or segment corresponding to the gap. The gaps may be transmitted together with additional segments. For instance, the gaps may transmitted as segments, or they may be combined into a segment or combined into another segment.

Padding may be transmitted over channels to prevent any channel from becoming open to other transmitting nodes. In this way, a transmitting node may maintain control over multiple channels until all of (or a portion of) the stream is transmitted.

The transmission rates of the various channels may be monitored. Transmission rates may be changed based on error and other factors related to data transfer. Subsequent segments of the data stream may be sized according to the current transmission rates of the various channels.

Any rates of transmission are contemplated herein. For instance, two or more channels may have substantially identical or substantially different rates of transmission. Each wireless channel may be independent and have a different rate of data transmission. For instance, one channel may be transmitted at a rate of 1 Mbit/sec, while another may be transmitted at a rate of 3 Mbit/sec.

In some embodiments, one channel may transmit at a frequency of 5 GHz or greater (such as 10 GHz), and another channel may transmit at a frequency of less than (or greater than) 5 GHz, such as about 2.5 or 3 GHz. Any other frequency is contemplated herein.

Figure 1:
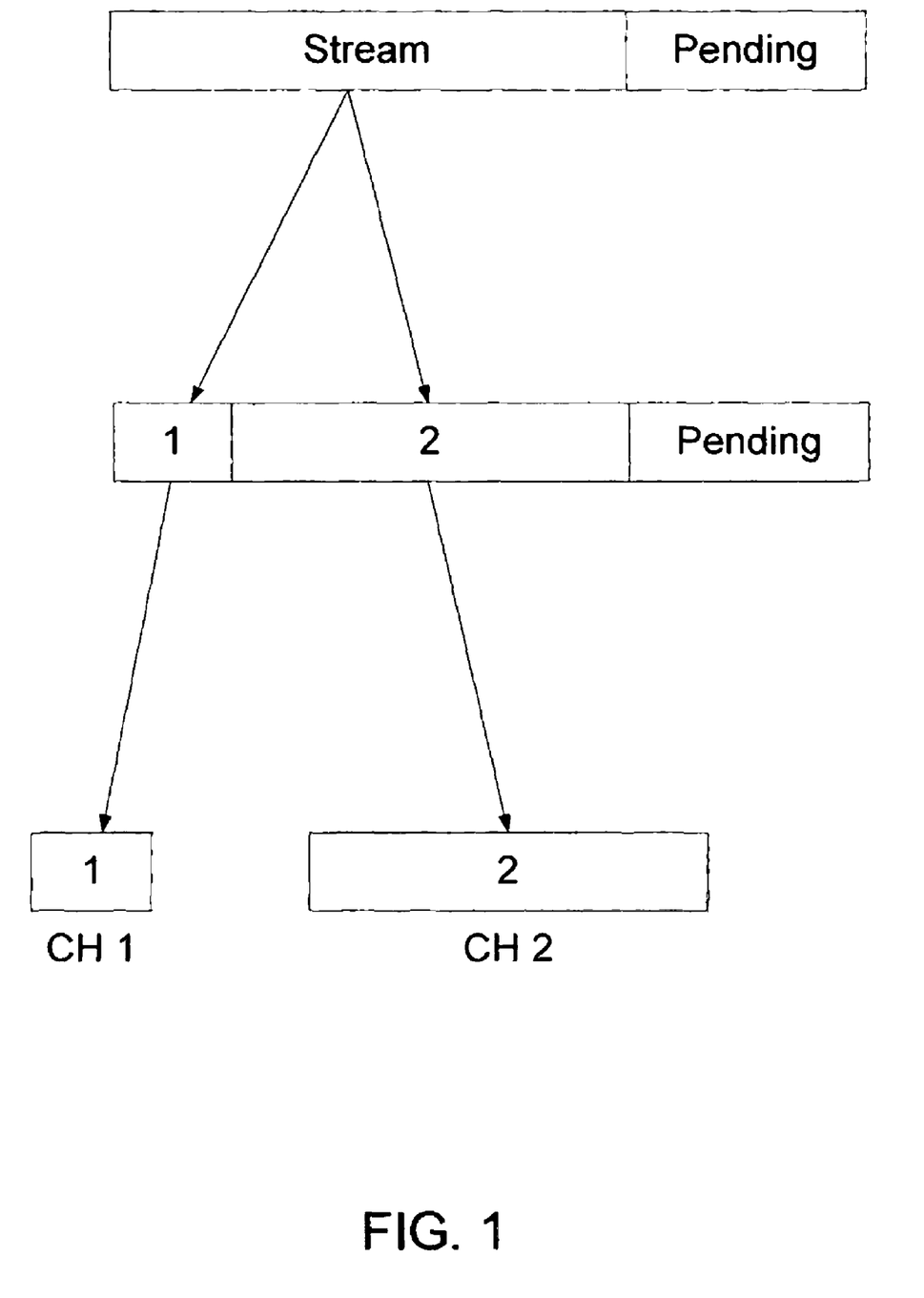
FIG. 1 depicts a method of dividing a stream of data into segments for transmission according to an embodiment of the invention.
Figure 2:
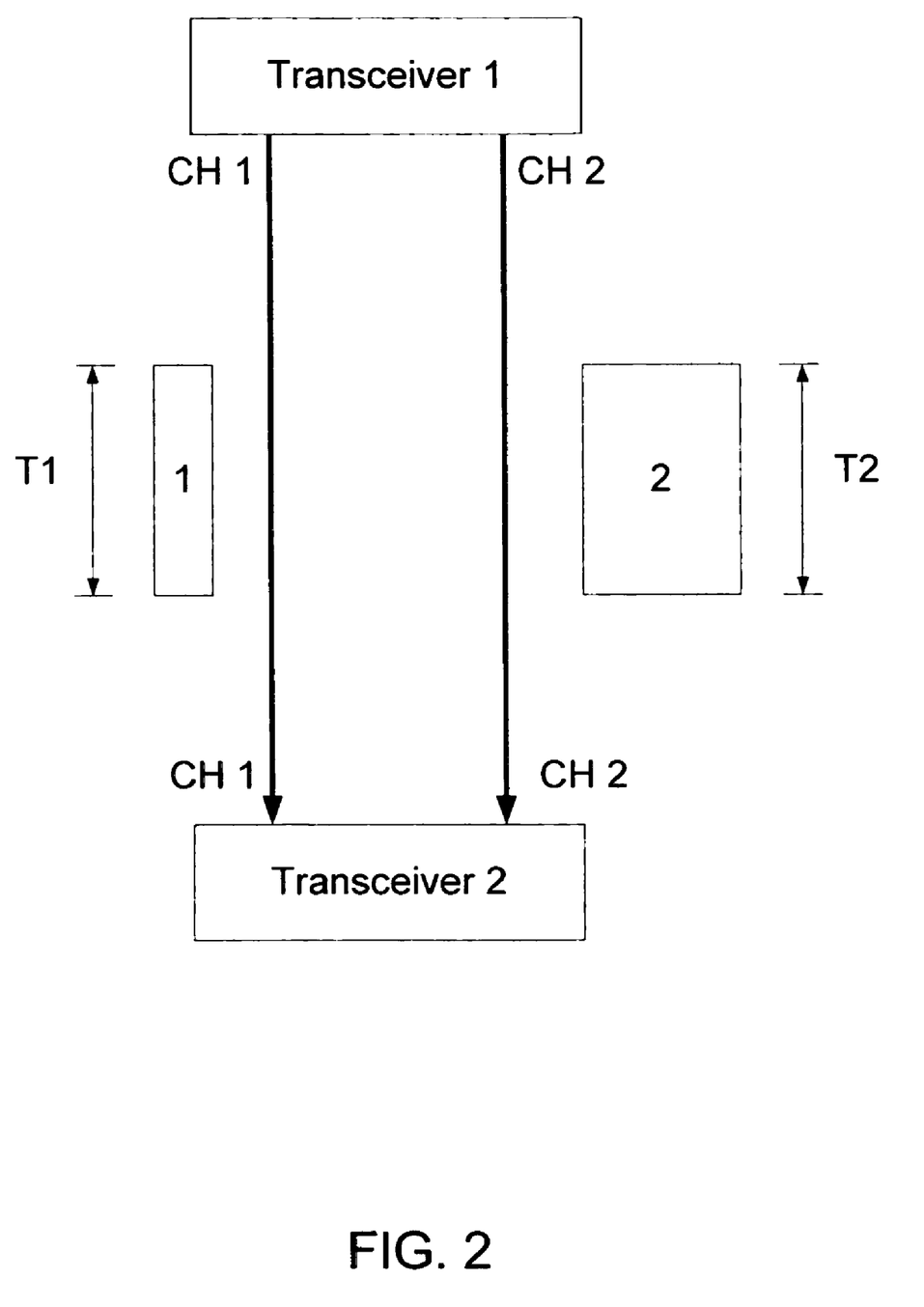
FIG. 2 depicts a system for transmitting multiple data segments over multiple channels according to an embodiment of the invention.
Figure 3:
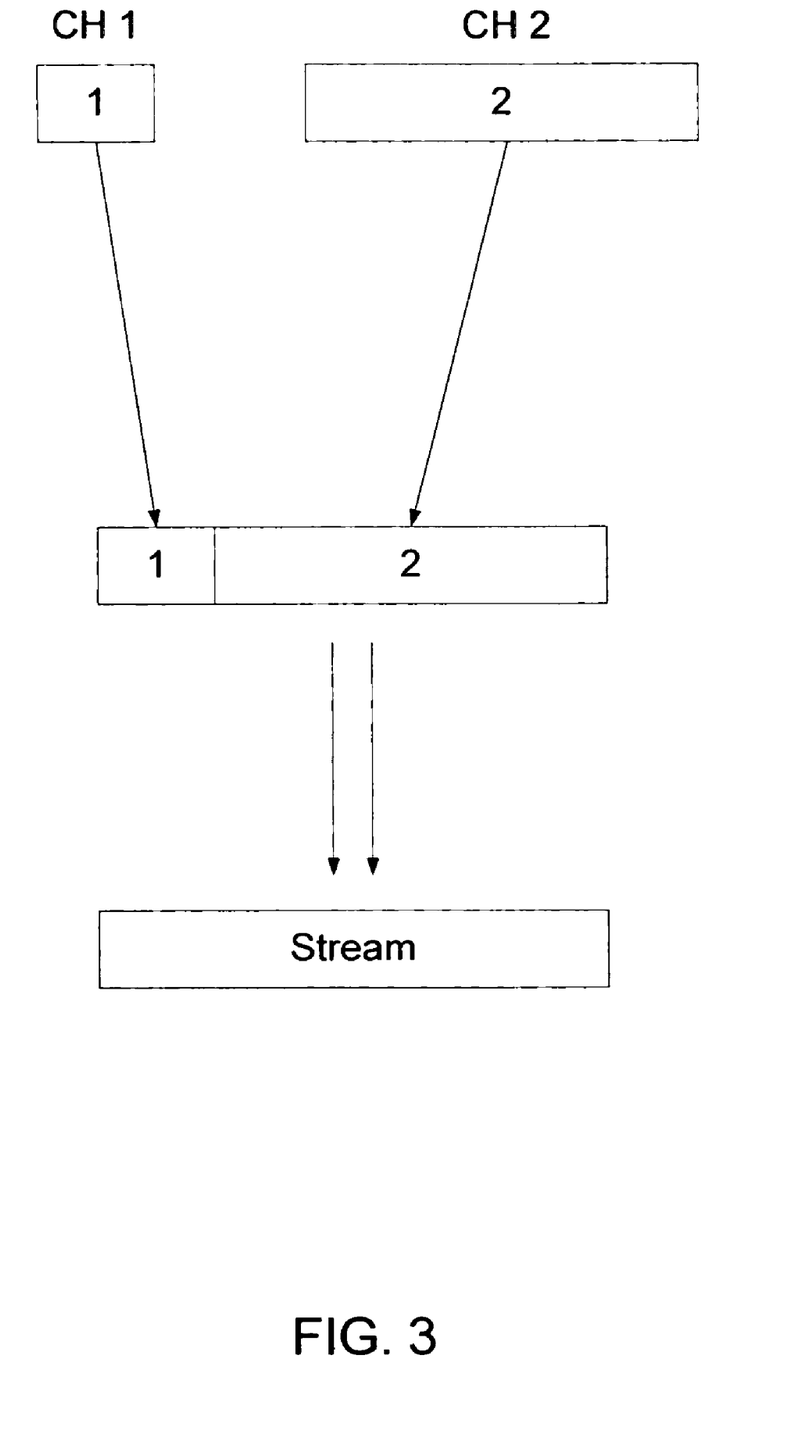
FIG. 3 depicts a method of concatenating segments into a data stream according to an embodiment of the invention.

FIGS. 1-3 collectively depict a process for transmitting a stream according to an embodiment of the invention.

FIG. 1 depicts a method of dividing a stream of data into segments for transmission according to an embodiment of the invention. As shown in FIG. 1, incoming data frames may be stored as a stream inside the Tx Media Access Control (MAC), as opposed to being stored as individual packets. (It should be noted that Ethernet frames and MPEG Transport Packets can be multiplexed.) The stream may be formed by concatenating incoming frames and packets.

As shown in the middle of FIG. 1, the Tx MAC may carve out a first data segment and a second data segment for transmission on a first channel and a second channel, respectively. It should be appreciated that additional data segments may be carved out for additional channels, if available. However, the present example and illustration shows only two data segments for ease of reference. FIG. 1 shows that the stream is carved into data segment 1 and data segment 2. Each segment contains indices which identify the location of the segment inside the flow.

The segment sizes may be based on the transmission rate of the various channels. For instance, the size of a segment may be proportional to the transmission rate of its corresponding data channel. Thus, if the second channel has double the transmission rate of a first channel, then the size of the second segment may be double the size of the first channel. As shown in FIG. 1, segment 1 has less data than segment 2, which may be correlated with a much smaller rate of transmission of channel 1 as compared to channel 2. In this way, the time it takes to transmit each channel's segment may be substantially equal. This is because the time of transmission is substantially equal to the segment size (data size) divided by the rate of data transmission. For example, it should take essentially the same amount of time to transmit a first segment and a second segment if the first segment has half the data size and is transmitted at half the data rate as compared to the second segment. Provided that the segment size divided by the rate of data transmission is substantially equal for the various segments and corresponding channels, their times of transmission will be substantially equal. Thus, the segments may be transmitted simultaneously. For instance, they may be transmitted from a transceiver at various different frequencies (channels) on a single signal.

As shown at the bottom of FIG. 1, segments 1 and 2 may be passed for transmission to channels 1 and 2, respectively.

FIG. 2 depicts a system for transmitting multiple data segments over multiple channels according to an embodiment of the invention. As shown in FIG. 2, data segments 1 and 2 are passed from transceiver 1 to transceiver 2 via transmission channels 1 and 2, respectively. For instance, the MAC may transmit segment pairs (or triplets, etc.) which are prepared by the MAC using no-ACK. Periodic Stream ACK frames may report the receive status.

In FIG. 2, the transmission time for segment 1 is labeled t1, and the transmission time for segment 2 is labeled t2. Other segments, such as segment 3 and segment 4, etc. (not shown), may have transmission times t3 and t4, etc. The transmission times for the various data segments and channels may be substantially equal, and the transmissions of the two (or more) data segments may be synchronized and/or simultaneous across the two (or more) channels. Thus, as shown in FIG. 2, transceiver 2 may receive data segments 1 and 2 simultaneously.

It should be noted that it may not be necessary for the segments to have the same transmission duration, nor is it necessary for the segments to have the same transmission start times or end times. For instance, one segment may have one duration, a second segment may have a second duration, and a third segment may have a third duration, where the first, second, and third durations are not equal. However, while each segment may have a different starting and ending transmission time, each segment would still be transmitted during at least a portion of the same time period. Further, additional data preferably is not transmitted on a "finished" channel until all the channels had finished transmitting. However, the durations of the respective transmissions may be equalized by adding the proper amount of padding to the shorter segments.

FIG. 3 depicts a method of concatenating segments into a data stream according to an embodiment of the invention. As shown in FIG. 3, after a successful transmission, transceiver 2 may receive both complete data segments 1 and 2.

As shown in FIG. 3, the data segments may be concatenated. The data segments may be concatenated pursuant to transmitted instructions included in the one or more segments.

As shown in FIG. 3, the concatenated data is now the same as the original stream from FIG. 1. Thus, by this process, a stream of data may be deconstructed, passed from one transceiver to another, and then reconstructed into the original data.

Figure 4:
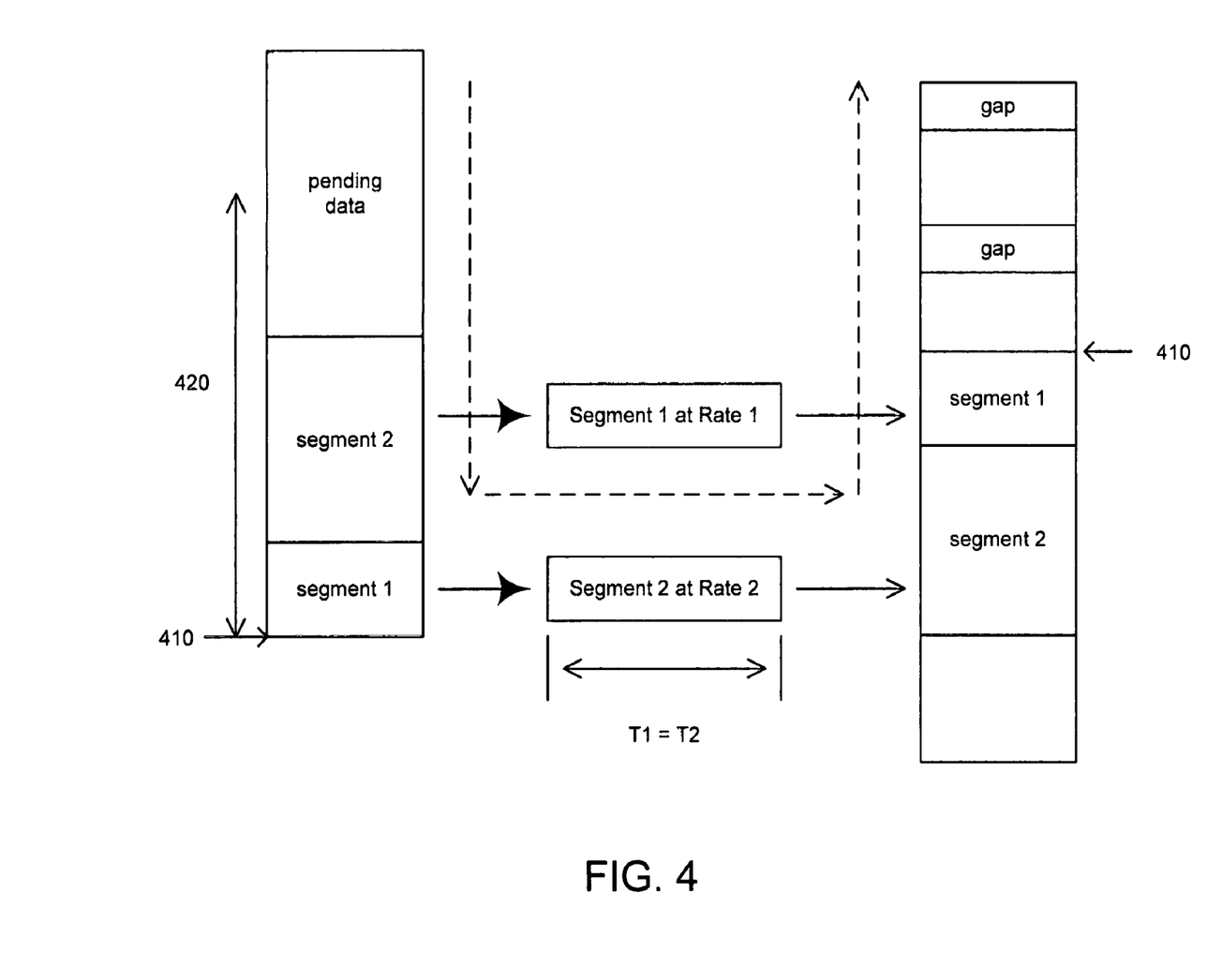
FIG. 4 depicts a transfer of data according to an embodiment of the invention.

FIG. 4 depicts a transfer of data according to an embodiment of the invention. For instance, FIG. 4 shows a representation of two-channel simultaneous transmissions of paired Stream Data frames, as depicted in FIGS. 1-3. Each frame contains one segment. FIG. 4 shows a receive index 410 and send window 420 containing a copy of the two segments.

It should be noted that the Tx MAC may add or modify MAC headers to the segments or portions thereof. The MAC may fill out some parts of the MAC header, such as duration. The MAC may also add encryption, MIC, Reed Solomon, FEC, and other features to the segment(s) and/or portions thereof.

Figure 5:
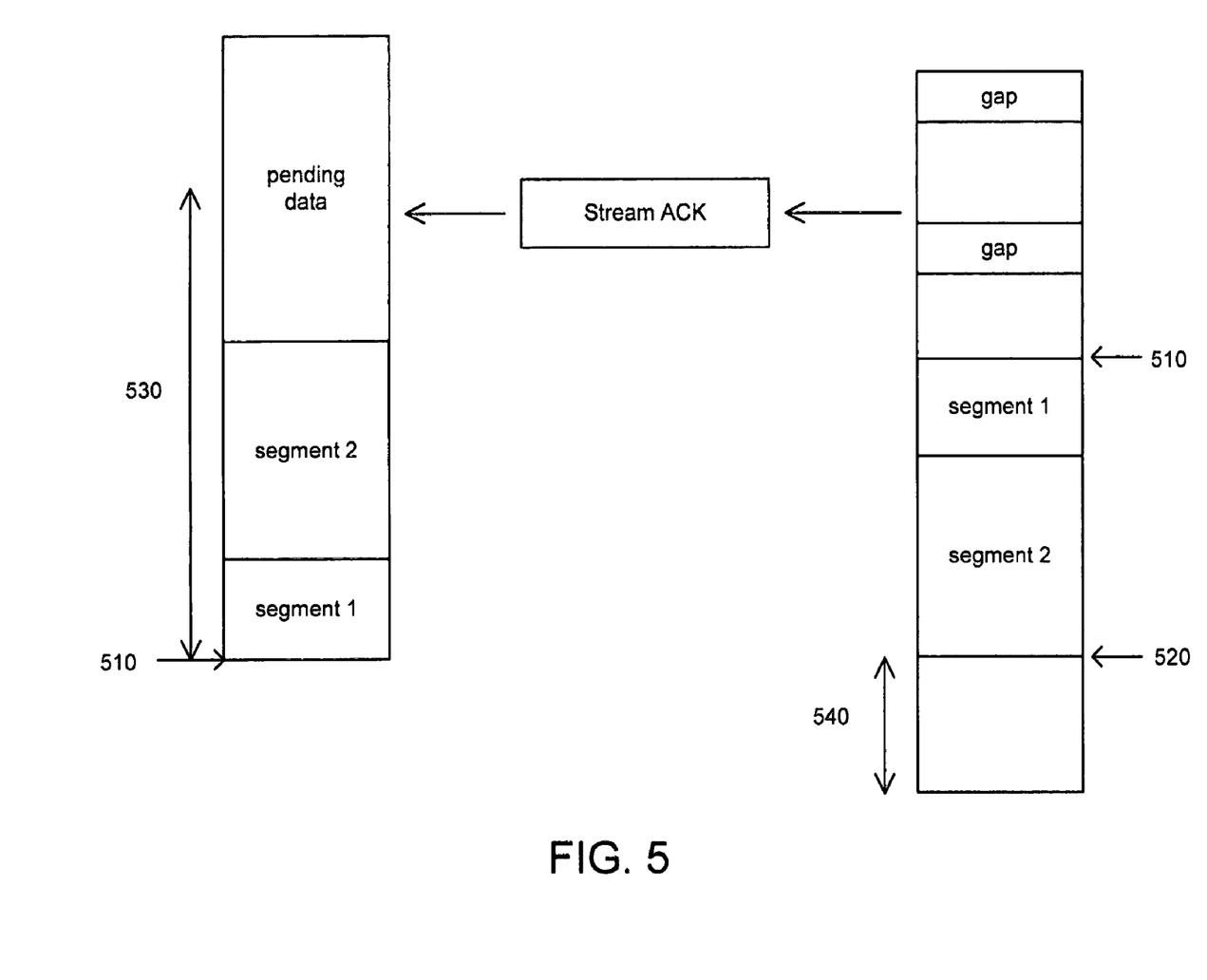
FIG. 5 depicts a transfer of a data acknowledgement according to an embodiment of the invention.

FIG. 5 depicts a transfer of a data acknowledgement according to an embodiment of the invention. As shown in FIG. 5, the receiving MAC may reconstruct the stream and send periodic stream ACK frames which may receive status, including missing blocks of data (or gaps). The receiving node may also transmit a new receive index 520. The old receive index is shown at 510.

The transmitting MAC may maintain a copy of the transmitted data until receipt is acknowledged. As shown in FIG. 5, the send window still contains segments 1 and 2. The transmitting MAC may transmit new data until the send window is depleted. The transmitting MAC may progress the send window based on the receive index inside the stream ACK. The stream ACK frame may include free buffer space 540 at the receiver.

Figure 6:
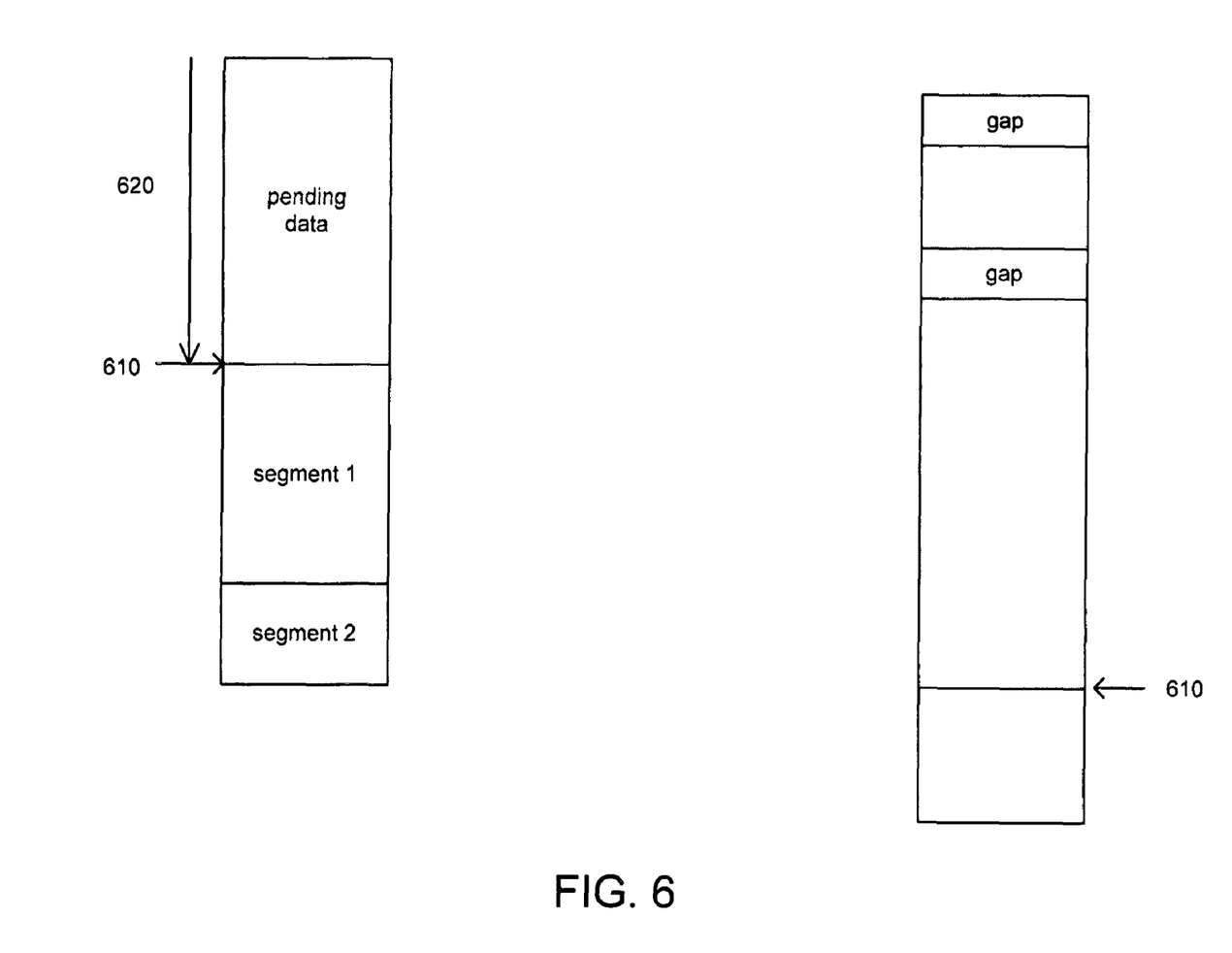
FIG. 6 depicts a data transfer status after a successful transmission of data segments according to an embodiment of the invention.

FIG. 6 depicts a data transfer status after a successful transmission of data segments according to an embodiment of the invention. As shown in FIG. 6, segments 1 and 2 are successfully received (and concatenated) at the receiving node, and the send window 620 may be progressed to a new Receive Index 610. The pending data may then be segmented and transmitted. It should be noted that the pending data may also be segmented prior to moving the receive index.

The receiving MAC may de-concatenate contiguous parts of correctly received data and announce the frames to an upper layer. Missing blocks of data may be retransmitted by the transmitting MAC, possibly combined with new data such as another segment or portion thereof. The missing blocks may be re-transmitted through one channel, or they may be separated into two or more channels for transmission.

For this transmission, segment sizes may be based on another mechanism. For instance, probes and histograms may be used to determine the appropriate segment size for a channel and the corresponding transmission rate. Again, transmission of the various segments may be synchronized and of substantially equal duration.

A +Poll can be added to stream data frames, for embedding TCP ACK and stream ACK inside the stream. The SIFS period between no-ACK packets to the same destination could be made smaller.

Dual channel channel access (or multi-channel channel access) may be based on a regular backoff on the primary channel, and access may be based on the PIFS backoff on the secondary (and/or other) channel. This may work for both EDCA and HCCA. Beacons may be transmitted on the primary channel, and in-use frames may be transmitted on a secondary (and/or other) channel. In one embodiment, there may be backward compatible operation on only one channel, such as the primary channel. In another embodiment, all (or some) of the channels may be backward compatible.

If the secondary (or other) channel gets occupied by overlapping BSS, it may switch to a new secondary (or other) channel. A Secondary Channel Switch (SCS) may be acknowledged to avoid leaving nodes behind. SCS may be transmitted to each associated client as a SIFS frame train. For instance, a stream of SCS data and ACK data may be transmitted in the following order: SCS-ACK-SCS-ACK-SCS-ACK-etc. In one embodiment, there may be no intermittent transmissions. In one embodiment, there may be retransmissions after PIFS, to avoid intermittent transmissions. For each client, the secondary (or other) channel may become active after transmitting the ACK. No transmissions may be possible until the SCS-train is over, because the SCS frames are transmitted on the primary channel, which precludes other nodes from transmitting on the secondary channel. The SCS frames may occupy a single channel, or multiple channels, or there may be a copy on the secondary (or tertiary, etc.) channel, or there may be some padding frame on the secondary (or tertiary, etc.) channel.

The following formats may be specified: compression encapsulation; multiplex encapsulation; segment concatenation encapsulation; stream data frame; stream ACK frame; or FEC encapsulation. Other formats may also be considered.

Compression may be used in the transmission of data. There may be compression in each data frame. In one embodiment, MPEG-TS data may not be compressed. In one embodiment, proprietary LLC encapsulation with LLC type 2 may be used. In one embodiment, compression may occur on the stream itself, instead of on the incoming frames.

Figure 7:
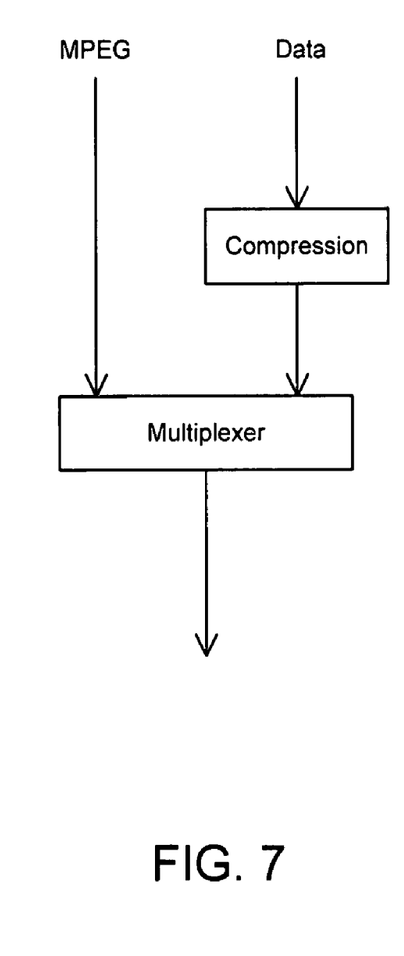
FIG. 7 depicts a process of combining data into a stream for transmission according to an embodiment of the invention.

FIG. 7 depicts a process of combining data into a stream for transmission according to an embodiment of the invention. For instance, as shown in FIG. 7, multiplex encapsulation may be used to multiplex Ethernet frames (or other data types) and MPEG-TS (or other data types) into a single stream. For instance, the type field may indicate the frame type. For instance, as shown on the page labeled 13 of Appendix A, a "0" may represent the Ethernet frame, and a "1" may represent the MPEG transport packet. A Len field may be added for ease of parsing. For instance, the Len field may be added between the type field and the frame field.

In regard to routing MPEG-TS data, MPEG transport packets may have no MAC address, but instead they may have a Program Identifier (PID). The MAC may contain a PID to DA mapping table. The PID/DA table may be maintained by an upper layer connection management entity.

Segment concatenation encapsulation may allow for retransmitted segments to be concatenated, possibly with newly carved segments. Retransmitted segments may be as small as a single FEC block. For instance, retransmitted segments may be in the order of 239 octets.

The stream data frame may use regular QoS-Data frame with a company specific LLC encapsulation. The stream data frame may use or comprise, for example, proprietary LLC encapsulation (Type 6); concatenated segment block size; concatenated segments; and/or padding (e.g., to adjust frame length to symbol size). These elements may be included in this order or another order.

The stream ACK frame may use or comprise a regular QoS-Data frame with proprietary LLC encapsulation. The stream ACK frame may use or comprise, for example, proprietary LLC encapsulation header (Type 7); receive index; free buffer space; gap count; and/or gaps. These elements may occur in this order or in another order.

Figure 8A:
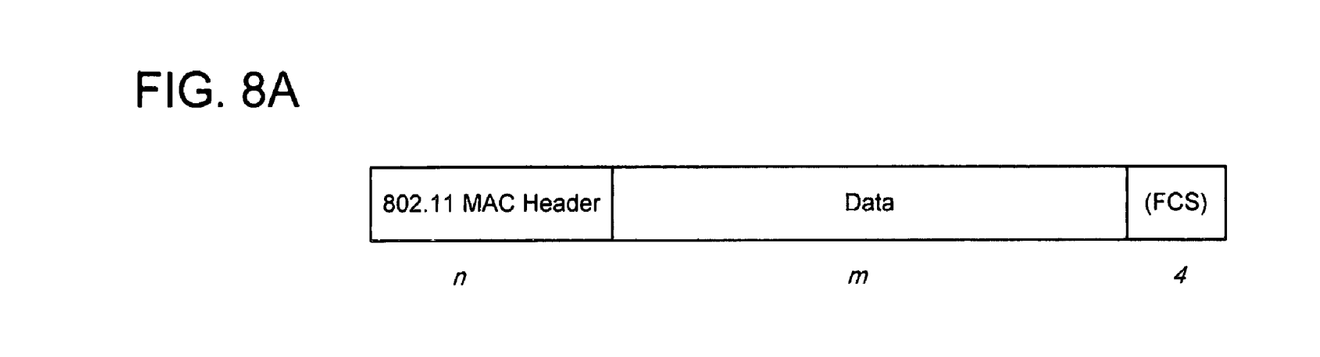
FIGS. 8A and 8B depict data transmissions using different error correction methods according to various embodiments of the invention.
Figure 8B:
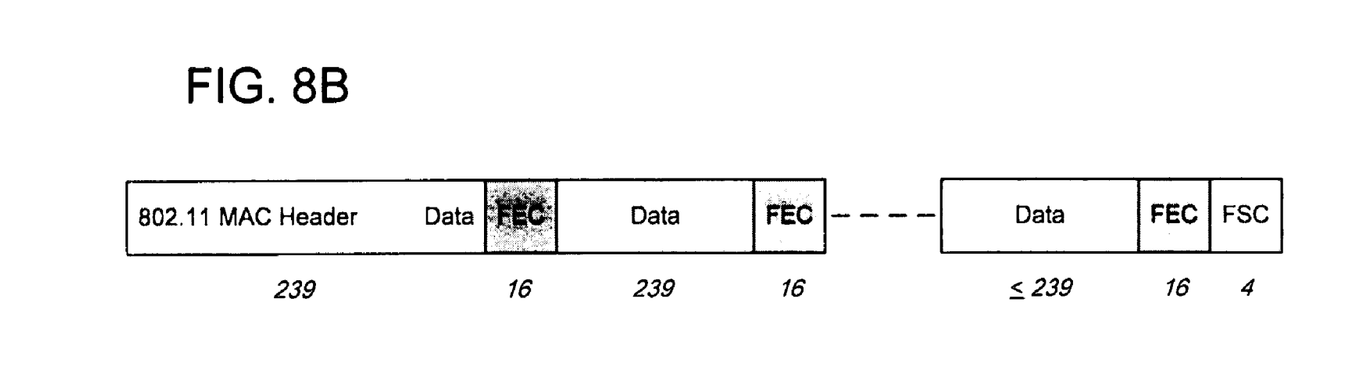

FIGS. 8A and 8B depict data transmissions using different error correction methods according to various embodiments of the invention. FIG. 8A shows a transmission of data without FEC, and FIG. 8B shows a transmission with FEC.

As shown in FIG. 8B, the transmission and/or reception may use Reed Solomon FEC Encapsulation (such as Reed Solomon FEC Encapsulation 1). For instance, FEC encoding may be indicated in bit 15 of the Frame Control Field and bit 9 of the QoS Control field (or other bits). FEC parity may be added after every 239 frame octets, e.g., including the MAC header. The FCS may be calculated over the entire FEC encoded frame and appended. An inner-FCS may not be needed because the integrity of the data can be inferred from the added FEC parity. An inner-FCS may or may not be used. The use of FEC may also be indicated inside a proprietary LLC encapsulation header.

To generate an input stream, the following steps may be used: compression, which may be for data frames only, or for other frames; multiplexing (i.e. concatenation); segmentation; framing; encryption, MIC; and FEC. These steps may be accomplished at the MAC level. Not all of these steps may occur, and other steps may be used or substituted herein, and compression may occur after multiplexing and before segmentation.

It should be noted that the systems and methods described herein may be used for two channels, and it also may be used for any number of channels greater than one. The different channels may be transmitted at different frequencies. The transmission may be received by one or more other receivers or transceivers.

The embodiments of the present inventions are not to be limited in scope by the specific embodiments described herein. Indeed, numerous variations, changes, substitutions and equivalents will be apparent to those skilled in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, it is intended that all subject matter described herein and shown in the accompanying drawings be regarded as illustrative only and not in a limiting sense and that the scope of the invention be solely determined by the appended claims. Also, the claims set forth below should be construed in view of the full breadth and spirit of the embodiments of the present inventions as disclosed herein.

What is claimed is:

1. A method of transmitting a stream of data, comprising:
identifying a stream of data to be transmitted by a transceiver;
dividing, at the transceiver, the stream of data into a plurality of data segments for transmission on a corresponding plurality of transmission channels, each of the plurality of transmission channels configured to transmit at a respective transmission rate, a first of the plurality of transmission channels transmitting at a first transmission rate, and a second of the plurality of transmission channels transmitting at a second transmission rate different than the first transmission rate, the stream of data being divided such that each data segment has a relative size that is substantially directly proportional to the respective transmission rate of the corresponding transmission channel; and
transmitting, from the transceiver, the plurality of segments on the corresponding plurality of transmission channels, each segment being transmitted at substantially the same time as the other segments and for substantially the same duration of time.

2. The method of claim 1, wherein the plurality of transmission channels comprises at least two frequency channels.

3. The method of claim 1, wherein the plurality of transmission channels comprises at least one channel having a frequency less than 3.5 GHz and at least one channel having a frequency greater than 4 GHz.

4. The method of claim 1, wherein the plurality of transmission channels comprises at least two channels having substantially different frequencies, wherein the at least two channels have frequencies that are in the range of 1 GHz to 10 GHz.

5. The method of claim 1, further comprising: prior to the dividing action, combining a plurality of data sets into the stream of data.

6. The method of claim 5, wherein combining the plurality of data sets comprises multiplexing MPEG data and at least one Ethernet frame.

7. The method of claim 6, further comprising: prior to multiplexing MPEG data and at least one Ethernet frame, compressing at least one data set of the plurality of data sets.

8. The method of claim 1, further comprising:
receiving confirmation from a receiving node that the data segments were properly received; and
based on the confirmation, transmitting a second plurality of segments of the data stream over the transmission channels.

9. The method of claim 1, further comprising:
receiving from a receiving node an identification of one or more gaps in the plurality of segments; and
transmitting the one or more gaps.

10. The method of claim 9, wherein the one or more gaps are transmitted together with segments.

11. The method of claim 1, wherein padding is added to one or more segments in order to substantially equalize transmission times of the one or more segments.

12. The method of claim 1, further comprising: synchronizing symbols of the plurality of channels.

13. The method of claim 1, wherein the data stream is comprised of Ethernet frames.

14. A method of receiving data, comprising:
receiving a plurality of data segments in a transmission over a plurality of channels that begins and ends at substantially the same time, the plurality of data segments corresponding to a single stream of data transmitted from a single transceiver via the plurality of channels, each of the plurality of channels configured to transmit at a respective transmission rate, a first of the plurality of transmission channels transmitting at a first transmission rate, and a second of the plurality of transmission channels transmitting at a second transmission rate different than the first transmission rate the received data segments being divided such that each data segment has a relative size that is substantially proportional to the respective transmission rate of the corresponding transmission channel; and
concatenating the data segments into an order that corresponds to an original order of the data segments in the stream of data.

15. The method of claim 14, further comprising:
identifying gaps in the stream of data;
requesting from the single transceiver data corresponding to the receiving additional segments of data corresponding to the gaps; and
concatenating the data segments and the additional data segments into a single stream of data.

16. The method of claim 14, wherein the plurality of transmission channels comprises at least one channel having a frequency less than 3.5 GHz and at least one channel having a frequency greater than 4 GHz.

17. A transmission system, comprising: a transmission processor configured to divide a transmission stream of data into a plurality of data segments such that each data segment has a relative size that is substantially directly proportional to a respective transmission rate of a corresponding transmission channel of a corresponding plurality of transmission channels, a first of the plurality of transmission channels transmitting at a first transmission rate, and a second of the plurality of transmission channels transmitting at a second transmission rate different than the first transmission rate; and at least one transmitter electronically coupled to the transmission processor configured to transmit the plurality of data segments over the plurality of transmission channels such that each segment is transmitted at substantially the same time as the other segments and for substantially the same duration of time.

18. The transmission system of claim 17, further comprising:
- at least one receiver configured to receive the plurality of data segments over the plurality of transmission channels, wherein the receiver is physically remote from the transmitter; and
- a receiver processor electronically coupled to the receiver that concatenates the plurality of data segments into a reception stream of data that is substantially identical to the transmission stream of data.

19. A method of transmitting and receiving data, comprising:
- identifying a stream of data to be transmitted by a transceiver;
  - dividing, at the transceiver, the stream of data into a plurality of data segments for transmission on a corresponding plurality of transmission channels, each of the transmission channels being configured to transmit data at a respective transmission rate, a first of the plurality of transmission channels transmitting at a first transmission rate, and a second of the plurality of transmission channels transmitting at a second transmission rate different than the first transmission rate, each of the data segments corresponding to a transmission channel, each of the data segments being divided in a substantially directly proportional manner with the corresponding transmission channel;
  - transmitting, from the transceiver, the plurality of data segments on the corresponding plurality of transmission channels, wherein each segment is transmitted at substantially the same time for substantially the same duration of time;
  - receiving, at the transceiver, a plurality of data segments at substantially the same time via a plurality of transmission channels, wherein the plurality of data segments correspond to a stream of data transmitted from a transmission station via the plurality of channels; and
  - concatenating, at the transceiver, the plurality of data segments into an order that corresponds to an original order of the data segments in the stream of data.

20. The method of claim 19, wherein the plurality of transmission channels comprises at least one channel having a frequency less than 3.5 GHz and at least one channel having a frequency greater than 4 GHz.

* * * * *

UNITED STATES PATENT AND TRADEMARK OFFICE
CERTIFICATE OF CORRECTION

| | | |
|---|---|---|
| PATENT NO. | : 7,978,734 B2 | Page 1 of 1 |
| APPLICATION NO. | : 11/083080 | |
| DATED | : July 12, 2011 | |
| INVENTOR(S) | : Wentink | |

It is certified that error appears in the above-identified patent and that said Letters Patent is hereby corrected as shown below:

Column 8, line 37, in Claim 14, delete "rate" and insert -- rate, --.

Column 8, lines 48-49, in Claim 15,
delete "to the receiving additional segments of data corresponding to the gaps; and" and
insert -- to the gaps;
receiving additional segments of data corresponding to the gaps; and --.

Signed and Sealed this
Sixth Day of December, 2011

David J. Kappos
*Director of the United States Patent and Trademark Office*